US 7,082,397 B2

(12) United States Patent
Cohen et al.

(10) Patent No.: US 7,082,397 B2
(45) Date of Patent: Jul. 25, 2006

(54) SYSTEM FOR AND METHOD OF CREATING AND BROWSING A VOICE WEB

(75) Inventors: Michael H. Cohen, Burlingame, CA (US); Tracy Demian Wax, Fremont, CA (US)

(73) Assignee: Nuance Communications, Inc., Menlo Park, CA (US)

( * ) Notice: Subject to any disclaimer, the term of this patent is extended or adjusted under 35 U.S.C. 154(b) by 438 days.

(21) Appl. No.: 09/203,155

(22) Filed: Dec. 1, 1998

(65) Prior Publication Data

US 2002/0164000 A1 Nov. 7, 2002

(51) Int. Cl.
*G10L 21/00* (2006.01)

(52) U.S. Cl. .................. 704/270.1; 379/88.17
(58) Field of Classification Search ............. 704/270, 704/275; 379/88.17, 88.22, 88.01
See application file for complete search history.

(56) References Cited

U.S. PATENT DOCUMENTS

| 4,581,484 A | 4/1986 | Bendig ................. 364/900 |
| 4,887,212 A | 12/1989 | Zamora et al. ......... 364/419 |
| 4,974,191 A | 11/1990 | Amirghodsi et al. .... 364/900 |
| 5,418,717 A | 5/1995 | Su et al. .................. 704/9 |
| 5,442,780 A | 8/1995 | Takanashi et al. ....... 395/600 |
| 5,479,491 A | 12/1995 | Herrero Garcia et al. .. 379/88 |
| 5,548,631 A | 8/1996 | Krebs et al. ............ 379/58 |
| 5,603,031 A | 2/1997 | White et al. ............ 395/683 |

(Continued)

FOREIGN PATENT DOCUMENTS

| EP | 0 822 698 A2 | 2/1998 |
| EP | 0 847 179 A2 | 6/1998 |
| EP | 0 848 373 A2 | 6/1998 |
| GB | 2 317 070 A | 3/1998 |
| JP | 10079785 | 3/1998 |

OTHER PUBLICATIONS

"Integration of Speaker and Speech Recognition Systems", Reynolds, D.A., Heck, L.P., pp. 869–872, vol. 2, Toronto, Ont., Canada.

*Primary Examiner*—Vijay Chawan
*Assistant Examiner*—Michael N. Opsasnick
(74) *Attorney, Agent, or Firm*—Haverstock & Owens LLP

(57) ABSTRACT

The present invention allows a user to audibly and interactively browse through a network of audio information, forming a seamless integration of the world wide web and the entire telephone network browsable from any telephone set. Preferably a browser controller allows the user to receive audio information and to transmit verbal instructions. The browser controller links the user to voice pages, which can be any telephone station or world wide web page, in response to voice commands. Upon linking, certain information is played with an audio indicia which identifies a linking capability. If the user repeats the information set off by the audio indicia, the telephone number or URL of the selected link is transmitted to the browser controller. The browser controller establishes a new link with the identified telephone number or URL, and if successful, disconnects the previous link. The originator no longer needs to know of the existence of the receiver nor the telephone number or URL of the receiver because this invention provides a method to browse the entire telephone network and world wide web and to connect to a receiver by saying the name of the hyperlink. This brings the power of the world wide web to the telephone network. In effect, this invention takes the PSTN from its current state as a set of more than 800 million nodes including means to make pairwise connections and converts it to a highly interconnected browsable web, as well as integrating it with the entire world wide web.

46 Claims, 6 Drawing Sheets

U.S. PATENT DOCUMENTS

| | | | |
|---|---|---|---|
| 5,608,624 A | 3/1997 | Luciw | 395/794 |
| 5,689,669 A | 11/1997 | Lynch et al. | 395/355 |
| 5,692,187 A | 11/1997 | Goldman et al. | 395/619 |
| 5,732,216 A * | 3/1998 | Logan et al. | 709/203 |
| 5,790,044 A | 8/1998 | Lin et al. | 340/825.44 |
| 5,799,063 A | 8/1998 | Krane | |
| 5,937,384 A | 8/1999 | Huang et al. | 704/256 |
| 6,044,347 A | 3/2000 | Abella et al. | 704/272 |
| 6,058,363 A | 5/2000 | Ramalingam | 704/251 |
| 6,263,507 B1 * | 7/2001 | Ahmad et al. | 725/134 |
| 6,272,455 B1 | 8/2001 | Hoshen et al. | 704/1 |
| 6,275,801 B1 | 8/2001 | Novak et al. | 704/252 |
| 6,363,348 B1 | 3/2002 | Besling et al. | 704/270.1 |

* cited by examiner

RETURN FROM LINK

SYSTEM FOR AND METHOD OF CREATING AND BROWSING A VOICE WEB

FIELD OF THE INVENTION

The present invention relates to the field of information systems. More specifically, the present invention relates to the field of interactive voice response systems.

BACKGROUND TO THE INVENTION

A variety of services are available over the telephone network. Initially these services required a human operator. With the introduction of touch tone telephones, the caller could make selections and provide information using the telephone buttons. Recent developments have allowed users to make selections and provide information using natural speech. Such an interface in general makes it far easier for the user to gain access to such services. Examples of technology to implement such a voice system are found in U.S. patent application entitled A SYSTEM ARCHITECTURE FOR AND METHOD OF VOICE PROCESSING, Ser. No. 09/039,203, filed on Mar. 31, 1998, and in U.S. patent application entitled METHOD OF ANALYZING DIALOGS IN A NATURAL LANGUAGE SPEECH RECOGNITION SYSTEM, Ser. No. 09/105,837, filed on Jun. 26, 1998, and also in provisional patent application entitled A METHOD AND APPARATUS FOR PROCESSING AND INTERPRETING NATURAL LANGUAGE IN A VOICE ACTIVATED APPLICATION Ser. No. 60/091,047, filed on Jun. 29, 1998. These three patent documents are incorporated in their entireties herein by reference.

With the advent of natural language recognition systems, users could respond to interactive telephone systems using more natural spoken responses. Such systems are used for a variety of applications and are known as interactive voice response (IVR) systems. One known example is for providing information and services regarding flight availability, flight times, flight reservations and the like for a predetermined airline. Another well known use for such systems includes gaining information regarding stocks, bonds and other securities, purchasing and selling such securities, and gaining information regarding a user's stock account. Also, systems exist for controlling transactions in accounts at a bank. Other applications are also available.

While using such systems provides dramatic improvement over other voice information and voice services systems, there are still drawbacks. Each such system accessed by a user requires that the user make a separate telephone call. Often, information exists on related topics. For example, in the event a user contacts a voice service to obtain airline information and travel tickets, they may also desire a hotel room and dinner reservations in the destination city. Even if hotels are located in the destination city that provide a voice system of room rate and availability information and allow callers to reserve rooms automatically or manually, the user must hang up the telephone call during which they made airline reservations, somehow discover the telephone number for a hotel in the destination city and only then place the desired call. This procedure is cumbersome at best. The procedure can be dangerous when undertaken from an automobile in commute hour traffic.

Other automatic information and service systems are also available. The World Wide Web (also known as and hereinafter referred to as the "Internet") is a rapidly expanding network of computers which provide users with numerous services and a wealth of information. Unlike the voice systems discussed above, the Internet is primarily a visually based system which allows a user to graphically interact with an image or series of images on a display screen.

The Internet was originally created as a non-commercial venue to provide communication links between government institutions as well as institutions of higher learning. Today, the Internet has evolved to become a universal network of computers which now includes private industry as well as government institutions. The Internet has become accessible to many people from computers located in their homes, offices, or public libraries. People are able to locate updated information regarding the weather, stock prices, news and many other topics. Further, people are able to locate a wide variety of information regarding products and services.

The Internet offers many advantages over other media. The Internet seamlessly links information stored on geographically distant servers together. Thus, users are capable of seamlessly accessing information stored on geographically distant servers. Similarly, the information on a server can be remotely updated from any geographic point that has access to the Internet.

When the user accesses information on a server, the user interfaces with the server through a website. Many websites offer hyperlinks to other websites, which makes the Internet user-friendly. When a current website has a hyperlink to another website, the user is enabled to jump directly from a current website to this other website without entering an address of this other website. In use, a hyperlink is a visually discernable notation. The user activates the hyperlink by "clicking" on the hyperlink notation or icon also called point-and-click. The user's computer is programmed to automatically access the website identified by the hyperlink as a result of the user's point-and-click operation.

Unfortunately, Internet techniques are not readily applicable to a voice system. In a visual Internet system the graphical image remains on the display screen until changed by the user. This allows the user ample opportunity to carefully read all the images on the display screen as many times as desired before making an appropriate point-and-click choice. With a voice system, once the message is spoken it cannot be readily reviewed by the user. Thus, there is no previously known analogous operation to point-and-click in a voice system. Further, hyperlinking is not available for voice systems. Telephone calls are made through the central office on a call-by-call basis. In contrast, in the Internet, once connected computers are functionally connected to all Internet addresses concurrently. Different sites are accessed by requesting information which is located at different addresses. At least these differences make ordinary Internet techniques inapplicable to a voice system. What is needed is a system for browsing an audio network.

The PSTN (Public Switched Telephone Network) provides means for more than 800 million individual 'stations' to make any pairwise connection by one party (the originator) dialing the telephone number of another party (the receiver). A station can be any person with a telephone, an IVR system or an information service among others. The current approach has two disadvantages. First, the originator must know of the existence of the receiver. There is no easy way to browse or discover information or receivers that may be of interest to the originator. Second, the originator must know the telephone number of the receiver. Furthermore, from the telephone there is no convenient way to browse web pages that may or may not be audio enabled. Additionally, there is no integration between the PSTN and the world wide web that would allow seamless browsing of both as an integrated web.

SUMMARY OF THE INVENTION

The present invention is a system and method for allowing a user to audibly and interactively browse through a network of audio information. This system and method preferably includes a browser controller which allows the user to receive audio information and to transmit verbal instructions. The browser controller preferably links the user to telephone stations, voice-enabled world wide web pages, and regular world wide web pages, in response to voice commands. Upon linking to a voice page, telephone station or world wide web, certain information is played with an audio indication of linking capability of that information. For example, the information could be set apart by using earcons, which consist of special sounds played before and after the link text. Other audio indications besides an earcon may be used, such as speaking the link in a different voice than the main text, setting the link text apart from t he surrounding text with pauses, or playing a background sound mixed in with the link. If the user repeats the information set off by the earcon or other means, the voice page transmits the telephone number or the URL of the selected link to the browser controller. The browser controller establishes a new link with the identified new telephone number or world wide web page. If the new link is made successfully, the first call is dropped.

The present invention overcomes the limitations of requiring the originator to know of the existence of the receiver as well as the telephone number or URL of the receiver by providing a method to browse the entire telephone network, as well as to audio browse the world wide web, and to connect to a receiver by saying the name of the hyperlink. This brings the power of the world wide web to the telephone network. In effect, this invention takes the PSTN from its current state as a set of more than 800 million nodes including means to make pairwise connections and converts it to a highly interconnected browsable web. In addition, this invention integrates the entire PSTN with the entire world wide web into one large audio-browsable network.

It is an object of the present invention to provide a system which allows a user to audibly browse an audio network.

BRIEF DESCRIPTION OF THE DRAWINGS

The following drawings illustrate an embodiment of the present invention. Other embodiments are possible and are described herein.

DETAILED DESCRIPTION OF THE PREFERRED EMBODIMENT

Figure 1:
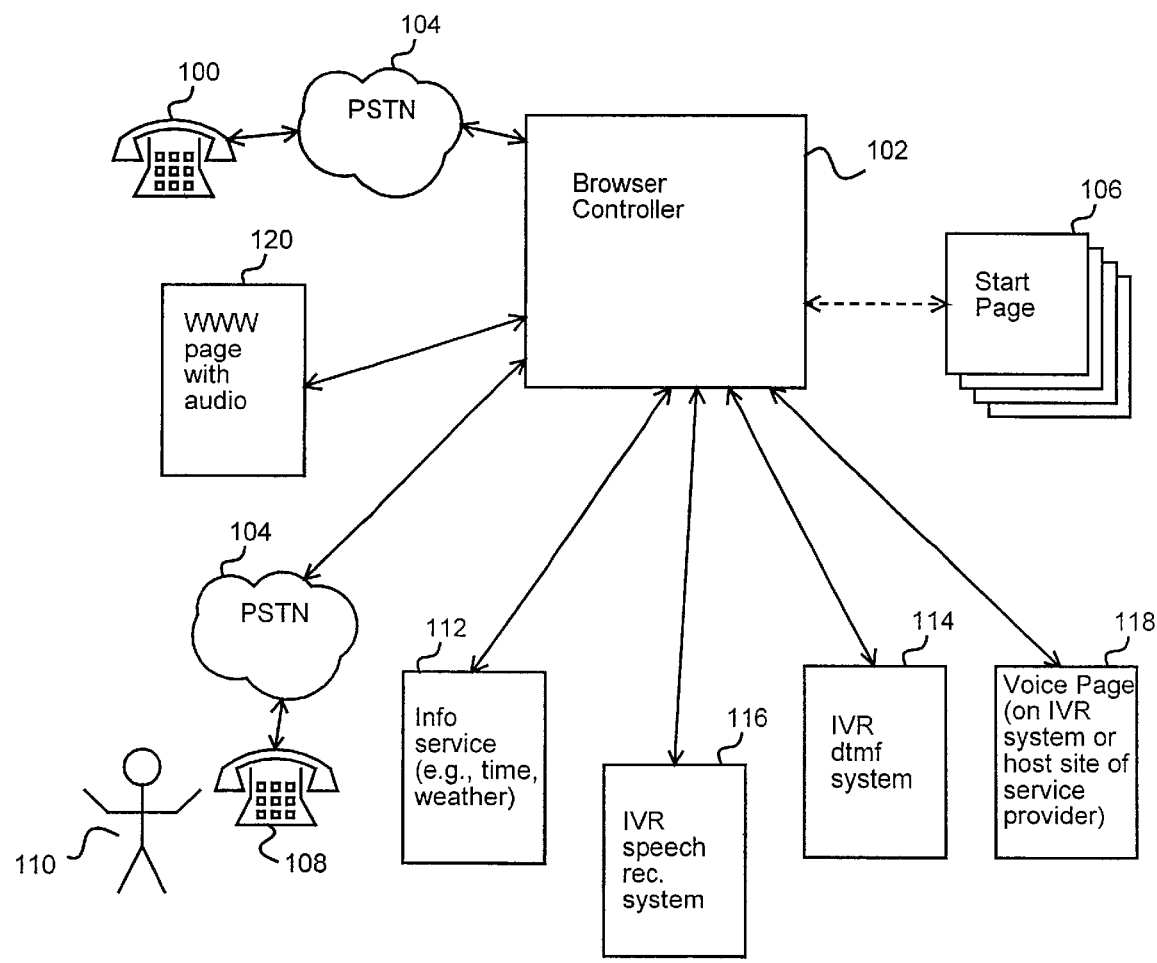
FIG. 1 illustrates an overall block diagram of the present invention.

The present invention is directed toward a voice activated system that is designed to allow a user to request, navigate, retrieve, and store information from a network of telephone stations, "interactive voice response" (IVR) stations voice-enabled world wide web pages and regular world wide web pages. This complete set of telephone numbers, and URLs is referred to as voice pages. Voice pages that have been designed to operate cooperatively with the present invention as well as all regular world wide web pages can take advantage of the features of the present invention, including hyperlinking. Conventional telephone stations or currently existing IVR stations cannot take advantage of hyperlinking, but other browsing capabilities will still be available. These voice pages will link to other voice pages to form a network. All conventional telephone stations are also part of this network. The various voice web pages are capable of being linked together to form the pseudo-network of voice web pages by having a browser which can connect to any voice web page, be it either a telephone number on the PSTN or a URL on the world wide web.

The present invention contemplates several principal uses of a system incorporating these teachings. First, is contemplated that users will generate specific applications which include voice pages or world wide web pages which are specially configured to take advantage of the voice browsing capacity of the present invention. In addition, the present invention also includes the capability to allow access to the more than 800 million already existing conventional telephone nodes plus voice pages in addition to world wide web pages which can be read by a text-to-speech converter. This is true regardless of whether or not the intended recipient of the call is aware of the existence of the present invention. Thus, a user can access any of a plurality of known telephone numbers, IVRs, voice information services or world wide web pages which were not designed to take advantage of the present invention and a user can also access IVR voice pages or world wide web pages designed with the president invention in mind. When accessing a voice page designed according to the present invention, the user will be presented with hyperlink options to other telephone numbers or URLs. When accessing other types of telephone numbers including a conventional telephone set, an IVR or a voice information service no hyperlink capability will be present. Nevertheless, certain features of the present invention will still be available to the caller. For example, the caller can return to their start page, return to a previous page or visit a bookmarked voice page.

With the present invention, the user could access a personal start page by dialing a telephone number assigned to that browser controller. The browser controller can connect sequentially to each desired voice page. The browser controller preferably maintains its connection to the user, makes connections to the desired voice page and joins those calls together. This allows the browser controller to monitor the calls between the user and each voice page. If a current voice page contains an audiolink to another voice page which is selected by the user, the browser controller makes a connection to the selected voice page, and then if this connection is successful, severs the call to the current voice page, all the while maintaining its connection to the user. The voice activated browser controller system thus allows the user to scout information or services available on a collection of available voice pages. The preferred embodiment of the present invention includes a browser controller and a variety of voice pages. The user is capable of directing the browser controller via the user's voice which frees the user's hands for other tasks such as driving. Further, the present invention relays information to the user via an audio source. The browser controller is also configured to contact any of the voice pages.

FIG. 1 shows an exemplary network which incorporates the preferred embodiment of the present invention. This representation of the present invention is not intended to be limited to a specific number or type of system. A user can access the system using any conventional telephone 100 system including a stand-alone analog telephone, a digital telephone, a node on a PBX and alike. The system includes a browser controller 102 which is accessed by the user using their conventional telephone 100. It is anticipated that the browser controller 102 will be provided as a service to many users requiring similar access thereto. Corporations could also use this invention to provide voice access to their websites for their customers, also potentially providing a linking ability to those sites to which they choose to allow such linking. Thus, typical users will access the browser controller 102 via the PSTN 104. However, in certain corporate or institutional environments a browser controller 102 may be made available to the users at the institution, such as in a PBX, thereby eliminating the need to connect the user's conventional telephone 100 to the browser controller 102 via the PSTN 104 and instead allowing a direct connection. Additionally, the browser controller 102 could be implemented in hardware and/or software in a personal computer, which also eliminates the need to connect the user's conventional telephone 100 to the browser controller 102 via the PSTN 104 and instead allowing a direct connection via the internet.

The browser controller 102 includes a pointer to a start page 106 for each user of the system. The start page 106 can operate in conjunction with the browser controller 102, being a personal home page for the user. The start page could also be any voice page on the voice web. The browser controller 102 possesses a static grammar to assist the user with navigation and other browser functions. In addition the browser controller 102 generates a dynamic grammar of the browsable links on each voice page that is visited. The browser controller 102 also includes a number of dynamic grammars which are modified according to the needs of each particular user. These grammars will be described in more detail below.

An originating user can place a telephone call using their conventional telephone 100 directly to a second conventional telephone 108 of another user 110 via the PSTN 104 in the usual way. There is nothing unusual in this and is conventionally done. In the alternative, using the present invention the originating user places a telephone call using their conventional telephone 100 to the browser controller 102. Once the link is established to the browser controller 102, the originating user is recognized and then instructs the browser controller 102 to place the call to the conventional telephone 108 via the PSTN 104. The originating user can be recognized using any known method. The browser controller 102 dials the telephone number of the second conventional telephone 108 to establish the link. The originating user is linked to the receiving user through the browser controller 102. In this way, the browser controller 102 has two links via the PSTN 104, one the originating user and one to the receiving user.

This linking through the browser controller 102 allows the originating user advantages over a conventional telephone call. The browser controller 102 includes a natural language speech recognition engine to 'listen' to the originating user. Each originating user speaks a known assigned 'browser wake-up' word to provide commands to the browser controller 102. The browser wake-up word is preferably not a commonly used word. Under certain circumstances a user may select their own browser wake-up word, but this is not preferred. When the browser controller 102 recognizes the browser wake-up word spoken by the originating user, the browser reverts to a command mode, to be discussed in more detail below. The browser controller 102 can be configured to simply wait for a command subsequent to the browser wake-up word, or the browser controller 102 can respond by saying, 'How can I help you?', for example. Depending upon the nature of the command, the link to the receiving user can be maintained or severed. Other calls can then be placed, such as those described below.

The originating user can establish other types of communications links using the browser controller 102. For example, the originating user might desire to receive audio information such as the time or weather. Other types of audio information are also available. As is well known, the originating user can dial the information service directly using the telephone number for that service. In the alternative, the originating user can dial the browser controller 102 and instruct it to call a predetermined information service 112. Once the call is established to the information service 112 by the browser controller 102, the originating user hears the desired information in the usual way. At any time, the originating user recites the browser wake-up word and can sever the call the information service 112 and have the browser controller 102 place another call.

The originating user can use the browser controller 102 to call an IVR system 114 which only recognizes dtmf tones. Once the browser controller 102 connects the originating user to the IVR dtmf system 114, the user can extract or provide information as necessary using the key pad on the conventional telephone 100. Upon concluding the desired transaction or communication, or at any time the user speaks the browser wake-up word, the originating user states the browser wake-up word, control is returned to the browser controller 102. Thereafter, the connection the IVR dtmf system 114 can be severed or reasserted.

Similarly, the originating user can use the browser controller 102 to call an IVR system 116 which includes a natural language speech recognitions system. Once the browser controller 102 connects the originating user to the IVR speech system 116, the user can extract or provide information as necessary using natural language. Upon concluding the desired transaction or communication or at any time the user speaks the browser wake-up word, the originating user states the browser wake-up word and control is returned to the browser controller 102. Thereafter, the connection the IVR dtmf system 116 can be severed or reasserted. For example, the user may speak the browser wake-up word to return control to the browser controller 102, but still desire to return to the present telephone link. Once the control is returned to the browser controller 102 any appropriate action can be taken. As one example, the user could request that a bookmark be made for the present page. Then, upon uttering the appropriate command the browser controller 102 returns the user to the pending link. All of the links described above are accessed via the PSTN using a conventional telephone number to initiate contact.

As another example, the originating user can use the browser controller 102 to call a page on the world wide web which has been audio-enabled and voice-enabled. The configuration of such a voice-enabled world wide web page 120 will vary according to the needs or desires of the developer. For example, the developer could include an ability to determine whether contact originated via the computer world wide web or from the PSTN and audio web. The developer can configure the page to include voice content in much the same way as a voice page 118. Any hyperlink that exists on the world wide web page could be identified by an audio indication in the way described herein. This hyperlinking could also take place in a world wide web page that has not been voice-enabled. The browser controller 102 could include a text to speech converter and read the contents of the page to the originating user which has made contact with the browser controller 102 via the PSTN. The same audio indications can be used to indicate the hyperlinks on the world wide web page.

Unlike the other links described above, a conventional page on the world wide web is not accessed using a telephone number over the PSTN. Rather, a page on the world wide web is accessed using an internet address. Further, with the internet world wide web information is generally transferred directly using a conventional protocol such as http. Communications via the internet are generally not carried out using data signals exchanged between pairs of modems over the PSTN. This is true in spite of the fact that many users access the internet via an ISP (internet service provider). The communications between the user and the ISP are carried out using data signals exchanged between a pair of modems; however, the communications for the same information transaction from the ISP to a site on the internet is carried out using an internet protocol such as TCP/IP or HTTP.

For at least this reason, without a direct internet connection, the browser controller 102 described above cannot interact directly with a conventional page on the world wide web. To overcome this obstacle, the browser controller 102 preferably includes a secondary dedicated internet connection to interface the browser controller 102 to the internet. The browser controller 102 is configured to bi-directionally communicate data between the browser controller 102 and the internet. Additionally, the browser controller 102 is also configured as a gateway to bi-directionally couple audio voice information between the user through the PSTN on the one hand, and the world wide web page via the internet on the other hand. As an alternative, each server that serves world wide web pages that include voice information configured to interact with a browser controller 102 according to the present invention could be configured to have access by telephone and a modem and further include its own gateway. However, it is clear that such a construction would require considerable duplication of equipment and software across all of the appropriate world wide web servers and pages.

A further alternative would entail providing PSTN access to world wide web pages. This approach overcomes the well known latency problems with the Internet. As internet latency issues are resolved, this approach will become even less desirable.

As another approach to providing access from the browser controller 102 to a world wide web page or IVR system, one can include an interface using the so-called I.P. telephony protocols. As is well known, I.P. telephony allows simultaneous transmission of both voice and digital data. Alternatively, a parallel telephone line and internet connection can be provided to emulate I.P. telephony. Yet another alternative allows the use of XML or another similar voice/data protocol (such as the Motorola® VoxML or Microsoft's HTML extensions) to provide internet access to a PSTN application such as the browser controller 102.

As clear from the discussion above, all of the features of the present invention, except for hyperlinking, can be utilized even when accessing conventional telephony services. This provides the originating user access to the existing more than 800 million telephone numbers by using the improved features of the present invention. The full power of the present invention can be achieved by connecting to a voice page 118 specifically designed to accommodate all the advantages of this invention, including hyperlinking as defined herein. The voice page 118 can be formed on an IVR system or as a world wide web page. As information is presented to the originating user certain voice items are specially identified to the user. For example, a particular audio information segment is configured to inform the user of the latest stock prices by stating, "The current trading price of <Apple> is $xx.xx dollars per share. The current trading price of <IBM> is $yy.yy dollars per share." The "less than" character ("<") represents an audible beginning marker, such as an earcon (defined below), to inform the user that a custom audiolink is beginning. Similarly, "greater than" character (">") represents an audible ending marker to inform the user that a custom audiolink is ending. Following this example, if the user wanted to learn more about the company Apple, then the user is able to say, "Apple". If limited to the above audio information segment and the user wanted to know more about "trading price", by verbally saying, "trading price," the user would not receive details on "trading price" because there is no audiolink to "trading price." The user would know that "Apple" is a valid audiolink, because the user can hear the beginning marker ("<") before the word "Apple" is read and can hear the ending marker (">") after the word "Apple". By way of example, the beginning marker ("<") can be represented as a sequence of three rising audible notes arranged such that the pitch for each note rises in the sequence. Additionally, the ending marker (">") can be represented as a sequence of three falling audible notes arranged such that the pitch for each note falls in the sequence. The term "earcon" is used for this process of audibly marking a custom grammar audiolink. The previous example is merely for demonstrative purposes only and should not be construed to limit the scope of the present invention. It will be apparent to those skilled in the art that there is no meaningful way to limit the number of ways to audibly mark a custom grammar audiolink. For example, the text of an audio link could be spoken in a different voice, a background sound could be mixed with the audio link, or the text of the audio link could be surrounded by pauses.

When the browser controller 102 hears the originating user repeat an audiolink, a new telephone number is dialed or a world wide web page is accessed in accordance with the repeated audiolink. If successful, the connection with the currently accessed voice page 118 is severed. The browser controller 102 knows the telephone number or the world wide web URL corresponding to the repeated audiolink, because that information was transmitted by the voice page 118 to the browser controller 102. There is sufficient bandwidth even on the PSTN 104 to allow such information to be transmitted between such equipment, transparently to the originating user and without any loss of ordinary speech functionality or quality.

Another type of connection can be established to a world wide web page which includes audio capability, or plain text that can be read via a text-to-speech converter. Such a page is configured to provide either graphical data, voice data or both, depending upon the type of equipment that accesses it. In this way, links can be shown as hypertext links in the usual way or as voice links with an earcon, or other audio indication, or both. Certain links will only be available to a computer user logged onto the internet and only provide a graphical information. Such links will not be presented with an earcon to the originating user of the present invention. Other links will only be to voice services and will only provide audio information. Such links will not be presented with a hypertext link on the graphical world wide web page. Still other links will be to a data provider that offers both graphical and audio data and both an audio indication and a hypertext link will be available.

The link to the world wide web page can be made by the browser controller 102 through a modem via the PSTN or via a gateway as is well known, though clearly a gateway is preferable. In either case such connections are utilized to provide the advantages of the present invention.

The originating user can perform a number of functions by using the browser controller 102. All originating users will have a predetermined suite of functions and commands available to them upon connection to their respective browser controller 102. Such functions are listed in Table 1, below. This list is exemplary and an implementation of the present invention can include more or less commands.

TABLE 1

GRAMMARS
Residing on Browser/Controller

| Static | Dynamic |
|---|---|
| next page | bookmark 1 |
| previous page | bookmark 2 |
| go back | . |
| go home | . |
| go to my start page | bookmark n |
| what are my choices | telephone number 1 |
| help | telephone number 2 |
| where am I | . |
| add this to my bookmarks | . |
| delete this from my bookmarks | telephone number n |
| go to my bookmarks | preference 1 |
| go to bookmark _____ | preference 2 |
| search | . |
| personal information | . |
|  | preference n |
|  | . |
|  | . |
|  | telephone number n |

Further, each originating user could develop a series of individual tasks for their browser controller 102 to perform which would be stored on their personal start page. Such dynamic information allows the originating user to make calls or connect to known services without having to remember telephone numbers. For example, while driving to work, an originating user could access their browser controller 102 and state the command 'weather'. The browser controller 102 will then dial the number it knows for the local weather report and allow the user to listen to the report. The browser controller 102 will maintain the connection until it 'hears' the browser wake-up word. Upon hearing the browser wake-up word, the browser controller 102 waits for a command. Our sample originating user then asks for her stock list. The connection to the weather report is severed and a new connection is established to the service that gives stock information. That connection is maintained until the browser controller 102 again hears the browser wake-up word. Our sample originating user then commands 'call mom'. Whereupon the browser controller 102 severs the connection to the stock list and dials the desired person. Our sample originating user concludes her call and then accesses a voice page 118 news report. During an advertisement, an audio indication announces a link to a local <restaurant>. Our sample originating user then says the name of the <restaurant>. The browser controller 102 automatically connects our sample originating user to the restaurant, then disconnects the present call, and then the originating user makes a lunch reservation. All these communication transactions occurred without our sample originating user having to dial any number except the first call to the browser controller 102. Further, she accessed both conventional telephones, IVRs, audio information services and voice pages in a single call to her browser controller 102.

There will be a set of static and dynamic grammars that will be active on each voice page 118. Depending on the implementation, voice recognition for the items in these grammars could reside as part of either the browser controller 102 or the voice page 118. Table 2 sets forth what these grammars might be. It is clear to anyone involved in the art that more or less items can be included in these grammars.

TABLE 2

GRAMMARS
Active on Voice Pages

| Static | Dynamic |
|---|---|
| help | dynamic links |
| what are my choices | |
| static links | |

There are dynamic grammars in the voice page because certain items may change periodically. For example, on a news voice page it is recognized that the news changes continually. The news reports will contain audio links to other voice pages, telephone numbers or audio information services and the like which correspond to the news report. Thus, these links will necessarily be dynamic. Either the voice page 118 or the browser controller 102 will generate the dynamic grammar links. For example, if the voice page 118 is a world wide web page, then the dynamic grammar will be generated by the text of the links that are denoted by the audio cues such as earcons.

Figure 2:
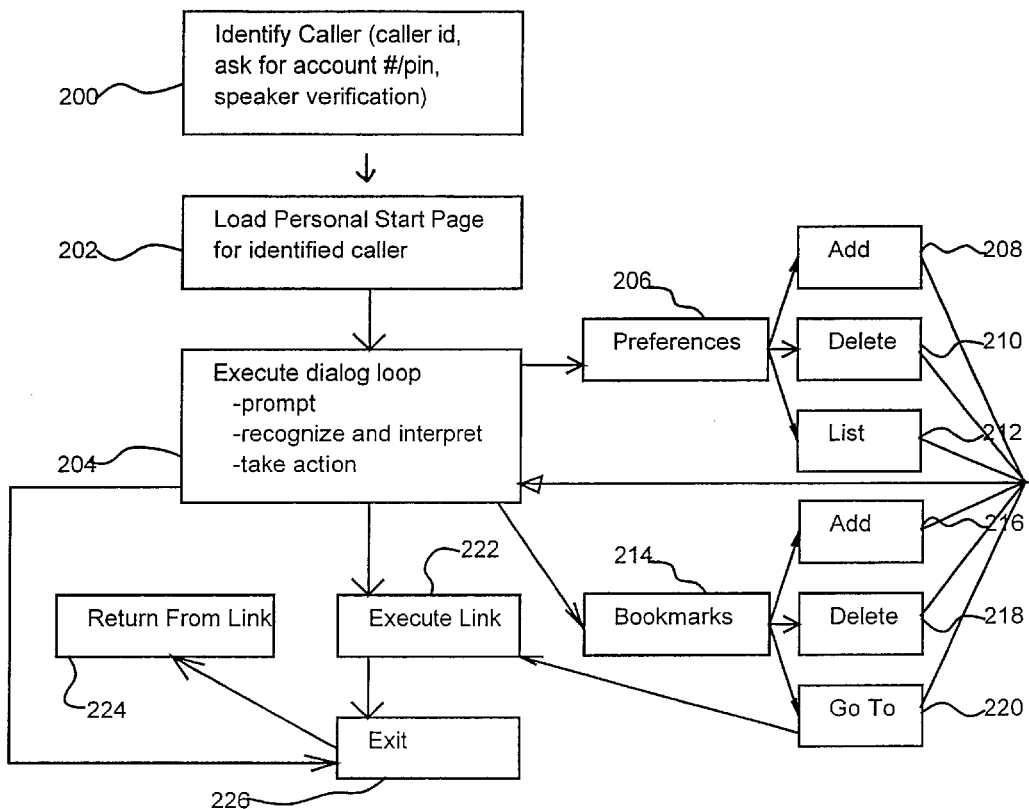
FIG. 2 shows a flow chart of the operation of the browser controller of the present invention.

FIG. 2 shows a flow chart of the operation of the browser controller 102 (FIG. 1). The originating user calls the browser controller 102 which identifies the caller using any known method in block 200. Once the originating user is identified, the browser controller 102 may load the start page 106 (FIG. 1) for that originating user in block 202. The browser controller 102 executes a dialog with the originating user in order to receive a command. For example, the prompt "Hello, Steve. How may I help you?" could be played. Depending upon this interaction including commands replied by the originating user, an activity will be performed. For example, if the originating user says, preferences 206, the browser controller 102 initiates a program related to their preferences. The originating user can then command add 208, delete 210 or list 212 to execute those functions. Upon concluding this activity, the browser controller 102 returns to the execute dialog block 204 and a new dialog exchange occurs between the originating user and the browser controller 102.

As another example, the user could command 'bookmarks' 214. The originating user can then command add 216, delete 218 or go to 220 to execute those functions. Upon concluding this activity, the browser controller 102 returns to the execute dialog block 204 and a new dialog exchange occurs between the originating user and the browser controller 102. In the alternative, the originating user could provide a 'go to' command or request an audio link which requires making a new telephone call. The browser controller 102, then enters the execute link block 222. This operation couples the originating user to another telephone number or world wide web page via the browser controller 102. Upon completion of the link the browser controller 102 will return to the execute dialog block 204 via the return from link block 224.

From the execute dialog block 204 the originating user can instruct the browser controller 102 to replay the originating user's start page. If no audio link is recited, the control is returned to the execute dialog block 204. If an audio link is recited, the execute link block 222 makes the appropriate connection. As mentioned before, the audio link could be set apart from the rest of the voice page by earcons; however, there are also other means for distinguishing an audio link.

The originating user can instruct the browser controller 102 in the execute dialog block to perform a search of voice pages 118. The search request can be performed by an appropriate search engine. Finally, the interaction can be concluded and the call placed on hook in the exit block 226.

Figure 3:
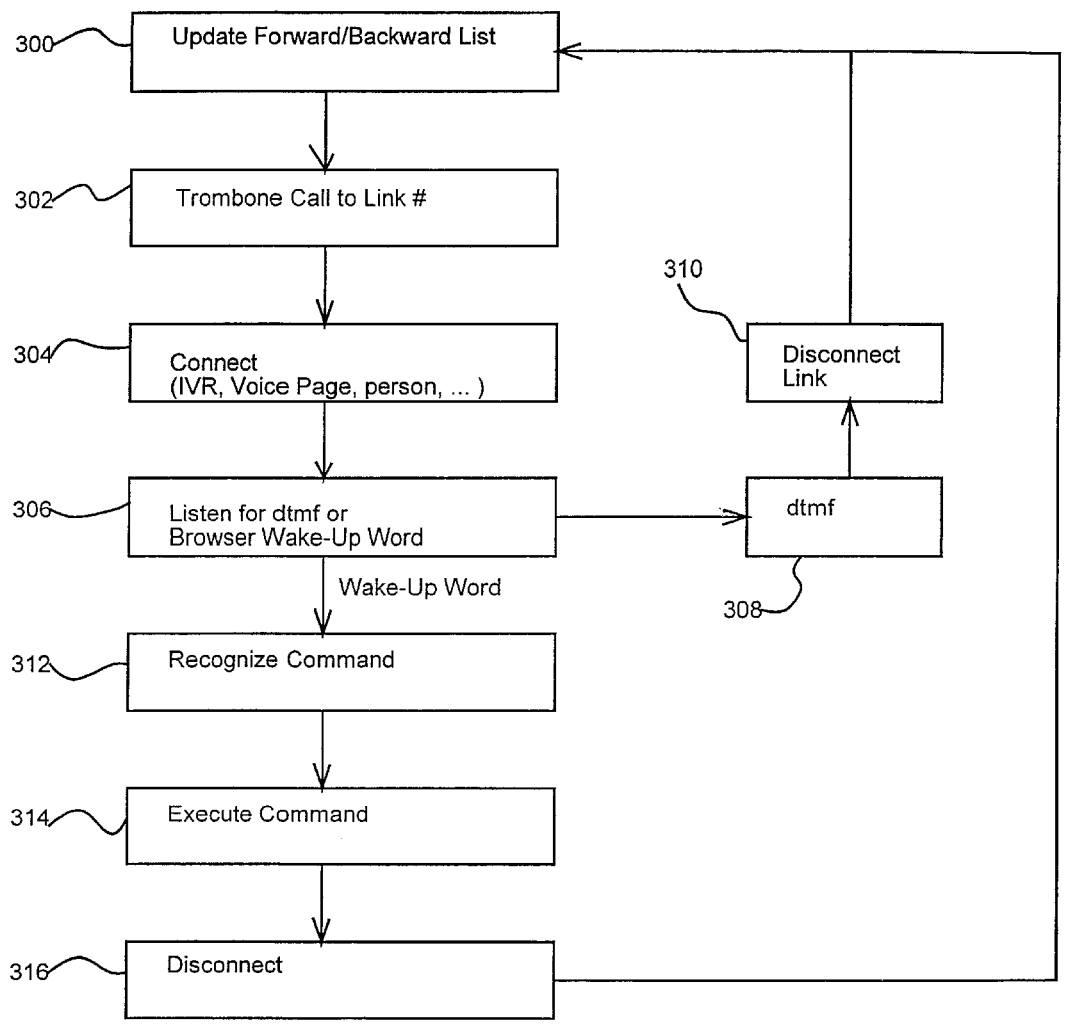
FIG. 3 shows a flow chart of the operation of the execute link block of FIG. 2.

FIG. 3 shows a flow chart of the operation of the execute link block 222 (FIG. 2). A list is maintained of the calls placed during the session. This allows the originating user to return to a previous call. Once the execute link block 222 is entered the forward/backward list is updated in the block 300 with the link information communicated with the command to execute link. The call is made to the link telephone number in the block 302. The call is connected to the desired telephone number in the block 304. Thereafter, while the call is in progress, the browser controller 102 (FIG. 1) listens for either dtmf or the browser wake-up word in the block 306. If a dtmf command is executed in block 308, the link is disconnected in the block 310, the forward/backward list is updated in the block 300 and a new call is made as before in the block 302. As an alternative to dtmf, as mentioned before, the browser controller's 102 telephone station and the voice page's telephone station could communicate via I.P. telephony or could include a parallel internet connection to emulate I.P. telephony. In this case, rather than using dtmf, the destination telephone number or world wide web URL could be communicated over this data channel. Furthermore, additional information such as the state of the user's interaction may be communicated. If the browser wake-up word is heard in the block 306, the recognize command block 312 identifies the command which is executed in the execute command block 314. If the command is not for a new link, control returns to the block 306 to continuing listening for dtmf or the browser wake-up word. If the command is for a new link, the current link is disconnected in the block 316, the link is disconnected in the block 310, the forward/backward list is updated in the block 300 and a new call is made as before in the block 302. Or, instead of making a call, a world wide web page could be downloaded off of the internet.

Figure 4:
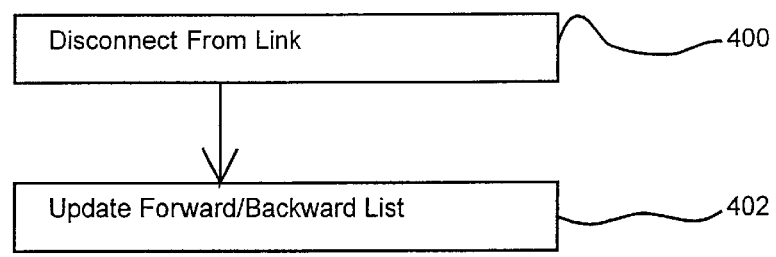
FIG. 4 shows a flow chart of the operation of the return from link block of FIG. 2.

FIG. 4 shows a flow chart of the operation of the return from link block 224 (FIG. 2). First, the telephone call is disconnected in the disconnect from link block 400. Then, the forward/backward list is updated in the update forward/backward list block 402.

Figure 5:
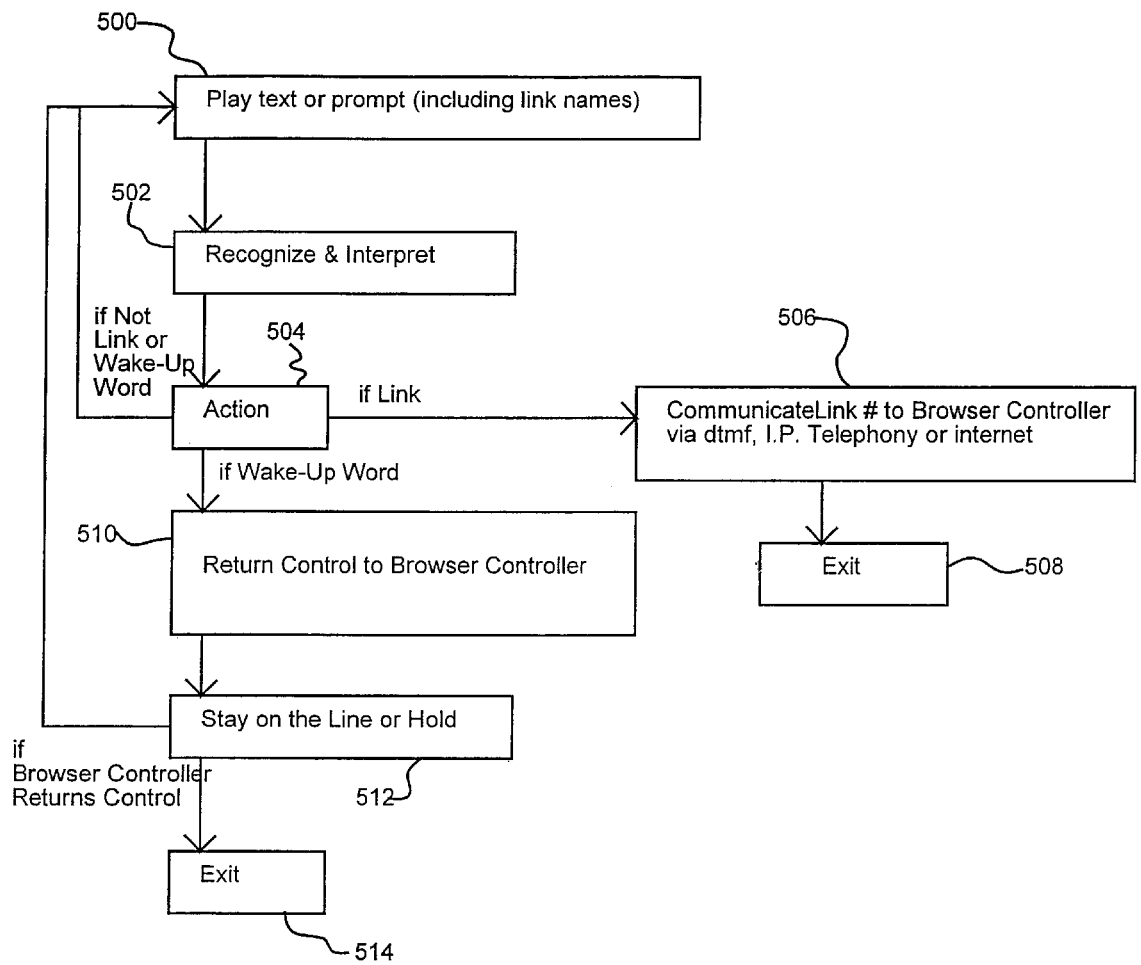
FIG. 5 shows a flow chart of the operation of the voice page of the present invention.

FIG. 5 shows a flow chart of the operation of the voice page 118 (FIG. 1). Upon being accessed, the voice page 118 plays audio text or prompts in the play text block 500. The prompts can include a link names or a list of link names. The speech of the originating user is recognized in the recognition block 502. Upon recognizing a command, an action is undertaken in the action block 504. If the action was stating the name of a hyperlink, the telephone number for that link is dtmf transferred to the browser controller 102 (FIG. 1) in the block 506. Alternatively, the link could be communicated to the browser controller 102 via I.P. telephony or an internet connection, as shown in the block 506. Thereafter, the voice page 118 is exited in the block 508 to return control to the browser controller 102. If the action was not a link and not the browser wake-up word, then the voice page 118 returns to the play text block 500. If the action was the browser wake-up word, control is returned to the browser controller 102 in the block 510. The line is maintained in an on-hold condition in the block 512. If the browser controller 102 returns control to the voice page 118, the operation returns to the play text block 500. If the browser controller 102 cuts the link, then the voice page 118 exits in the block 514.

Figure 6:
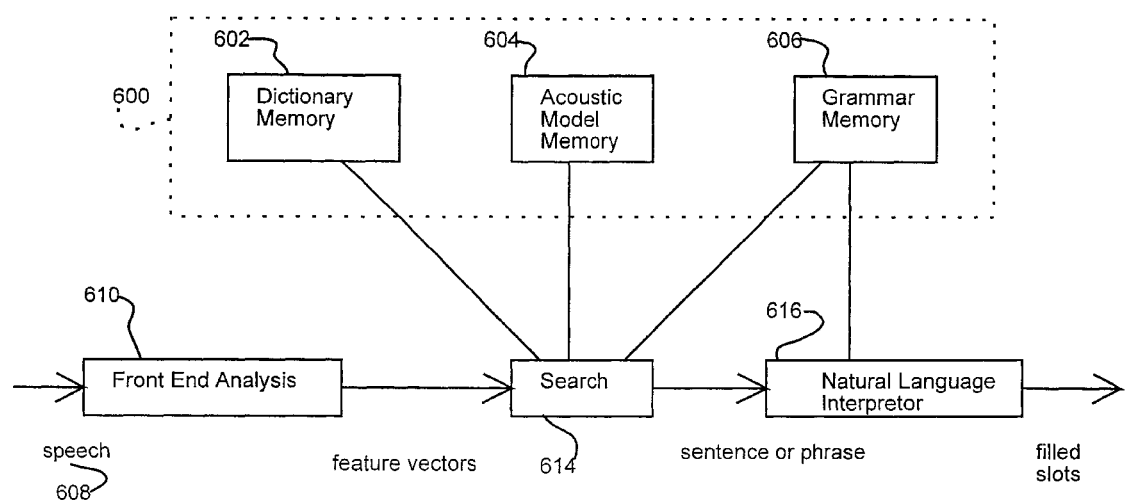
FIG. 6 shows simplified block diagram of a speech recognition and interpretation system of the present invention.

FIG. 6 shows a flow chart of the operation of the recognize and interpret steps in the browser controller 102 (FIG. 1) and the voice page 118 (FIG. 1). A memory 600 includes a dictionary memory 602, an acoustic model memory 604 and a grammar, and their pronunciations memory 606. The dictionary memory 602 contains all the words in the grammar. The acoustic model memory 604 contains all the statistical models of all phonetic units that male up the words. An input signal 608 of digitized speech is input to a front end analysis module 610. The front end analysis module 610 separates feature vectors from the digitized speech, each covering a predetermined length of speech. In the preferred embodiment, a feature vector is output for each 10 mS in length of the speech signal. The feature vectors are provided to the search engine 612 which compares the feature vectors to the language model. The search engine 612 uses the grammar memory which defines all of the word strings that the originating user might say, the dictionary memory defines how those words might be said and the acoustic memory stores the phonetic segments for the dictionary of words. A best guess is made for the words. This string of words is provided to the natural language interpreter 616 which assigns a meaning to those words.

It is possible for the present invention to be implemented and utilized by users that do not have their own browser controller or access an account on a service provider's browser controller. By way of example, consider an airline, car rental agency and hotel chain that agree market cooperatively. A user could call the airline to make travel arrangements to a city. The flight arrangements can be made and tickets can be purchased using an automated system. The automated system can include a browser controller. In such a case, the user could be prompted by appropriate earcons or other audio cues to then reserve a rental automobile with the cooperating car rental agency. The browser controller in the airline's automated system will then automatically connect the user to the car rental agency in just the way described above. Once the automobile is rented, the car rental agency's browser controller can then connect the user to the hotel chain to reserve a room.

As will be readily understood, the user in this example is daisy-chained to the hotel chain through both the airline browser controller and the car rental agency browser controller. When a user is daisy-chained, each call in the chain remains active and thus billed by the telephone service provider. Thus, it is preferable that the browser controller operate as described above wherein in it establishes a new call upon hearing the user repeat an audio link and then disconnects the previous call rather than daisy-chaining the calls through one another.

By way of another example of how the present invention can be utilized by users that do not have their own browser controller 102, consider that the airline described above does not wish to link to the hotel and the rental car voice pages. Even so, it is still to the airline's advantage to use the present invention. The browser controller 102 could read the airline's information as a voice-enabled world wide web page, thereby eliminating the need on the part of the airline for a separate IVR system with separate database integration. If a user has their own browser controller, then the airline does not need to provide telephone access to its world wide web page. However, if the user does not have their own browser controller 102, the airline can provide it for them. The airline could also lease time on a browser controller 102 that exists at an external call center, eliminating the need for the airline to have its own call center for telephone access to its world wide web page. This provides for considerable economies of scale, With intelligent caching of the airline's voice data, prompts and grammars, latency can still be kept to a minimum.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiments chosen for illustration without departing from the spirit and scope of the invention. For example, the Browser Controller 102 could be configured to first disconnect a present before establishing a new link.

Specifically, it will be apparent to one of ordinary skill in the art that the device of the present invention could be implemented in several different ways and the apparatus disclosed above is only illustrative of the preferred embodiment of the invention and is in no way a limitation. It will be apparent that the various aspects of the above-described invention can be utilized singly or in combination with one or more of the other aspects of the invention described herein. In addition, the various elements of the present invention could be substituted with other elements.

What is claimed is:

1. An apparatus configured to allow a user to interactively browse an audio telephony network, the apparatus comprising:
    a. means for coupling an originating user to a first telephony service at a first telephone number;
    b. means for providing a first audio marker with a first associated text having an associated second telephone number, wherein the first associated text is provided by the first telephony service and the audio marker distinguishes the first associated text from other text provided by the first telephony service, further wherein the audio marker is configured to be sensed by the originating user; and
    c. means for sensing the originating user repeating the first associated text and in response thereto coupling the originating user to a second telephony service at the second telephone number.

2. The apparatus according to claim 1 further comprising means for disconnecting the first telephony service upon sensing a successful coupling to the second telephony service.

3. The apparatus according to claim 1 wherein the first telephony service includes a plurality of audio markers with associated texts, each active upon access to the first telephony service.

4. The apparatus according to claim 1 further comprising:
    a. means for providing an audio marker with a second associated text, and having an associated URL for a voice-enabled world wide web page, wherein the second associated text is provided by the second telephony service and the audio marker is configured to be sensed by the originating user; and
    b. means for sensing the originating user repeating the second associated text and in response thereto coupling the originating user to the voice-enabled world wide web page at the associated URL.

5. The apparatus according to claim 4 further comprising means for disconnecting the first telephony service upon sensing a successful coupling to the voice-enabled world wide web page.

6. The apparatus according to claim 1 further comprising:
    a. means for providing an audio marker with a second associated text, and having an associated URL for a world wide web page operating in conjunction with a text-to-speech converter, wherein the second associated text is provided by the second telephony service and the audio marker distinguishes the second associated text from other text provided by the second telephony service, further wherein the audio marker is configured to be sensed by the originating user; and
    b. means for sensing the originating user repeating the second associated text and in response thereto coupling the originating user to the world wide web page at the associated URL.

7. The apparatus according to claim 6 further comprising means for disconnecting the first telephony service upon sensing a successful coupling to the world wide web page.

8. An apparatus configured to allow a user to interactively browse an audio telephony network, the apparatus comprising:
    a. means for coupling an originating user to a first voice-enabled world wide web page at a first URL;
    b. means for providing a first audio marker with a first associated text, and having an associated telephone number, wherein the first associated text is provided by the first voice-enabled world wide web page and the audio marker distinguishes the first associated text from other text provided by the first voice-enabled world wide web page, further wherein the audio marker is configured to be sensed by the originating user; and
    c. means for sensing the originating user repeating the first associated text and in response thereto coupling the originating user to a first telephony service at the associated telephone number.

9. The apparatus according to claim 8 wherein the voice-enabled world wide web page includes a plurality of audio markers, each active upon access to the voice-enabled world wide web page.

10. The apparatus according to claim 8 further comprising:
    a. means for providing an audio marker with a second associated text, and having an associated URL for a second voice-enabled world wide web page, wherein the second associated text is provided by the first telephony service and the audio marker distinguishes the second associated text from other text provided by the first telephone service, further wherein the audio marker is configured to be sensed by the originating user;
    b. means for sensing the originating user repeating the second associated text and in response thereto coupling the originating user to the second voice-enabled world wide web page at the associated URL.

11. The apparatus according to claim 10 further comprising means for disconnecting the first telephony service upon sensing a successful coupling to the voice-enabled world wide web page.

12. The apparatus according to claim 8 further comprising:
   a. means for providing an audio marker with a second associated text, and having an associated URL for a world wide web page configured to operate in conjunction with a text-to-speech converter, wherein the second associated text is provided by the first telephony service and the audio marker distinguishes the second associated text from other text provided by the first telephony service, further wherein the audio marker is configured to be sensed by the originating user;
   b. means for sensing the originating user repeating the second associated text and in response thereto coupling the originating user to the world wide web page at the associated URL.

13. The apparatus according to claim 12 further comprising means for disconnecting the first telephony service upon sensing a successful coupling to the world wide web page.

14. An apparatus configured to allow a user to interactively browse an audio telephony network, the apparatus comprising:
   a. means for coupling an originating user to a world wide web page at a first URL configured to operate in conjunction with a text-to-speech converter;
   b. means for providing a first audio marker with a first associated text, and having an associated telephone number, wherein the first associated text is provided by the world wide web page and the audio marker distinguishes the first associated text from other text provided by the world wide web page, further wherein the audio marker is configured to be sensed by the originating user; and
   c. means for sensing the originating user repeating the first associated text and in response thereto coupling the originating user to a first telephony service at the associated telephone number.

15. The apparatus according to claim 14 wherein the world wide web page includes a plurality of audio markers, each active upon access to the world wide web page.

16. The apparatus according to claim 14 further comprising:
   a. means for providing an audio marker with a second associated text, and having an associated URL for a voice-enabled world wide web page, wherein the second associated text is provided by the first telephony service and the audio marker distinguishes the second associated text from other text provided by the first telephony service, further wherein the audio marker is configured to be sensed by the originating user;
   b. means for sensing the originating user repeating the second associated text and in response thereto coupling the originating user to the voice-enabled world wide web page at the associated URL.

17. The apparatus according to claim 16 further comprising means for disconnecting the first telephony service upon sensing a successful coupling to the voice-enabled world wide web page.

18. The apparatus according to claim 14 further comprising:
   a. means for providing an audio marker with a second associated text, and having an associated URL for a second world wide web page configured to operate in conjunction with a text-to-speech converter, wherein the second associated text is provided by the first telephony service and the audio marker distinguishes the second associated text from other text provided by the first telephony service, further wherein the audio marker is configured to be sensed by the originating user;
   b. means for sensing the originating user repeating the second associated text and in response thereto coupling the originating user to the second world wide web page at the associated URL.

19. The apparatus according to claim 18 further comprising means for disconnecting the first telephony service upon sensing a successful coupling to the world wide web page.

20. A method of interactively browsing an audio telephony network comprising the steps of:
   a. coupling an originating user to a first telephony service at a first telephone number;
   b. providing an audio marker having an associated text, and within the first telephony service having an associated second telephone number, wherein the associated text is provided by the first telephony service and the audio marker distinguishes the associated text from other text provided by the first telephony service, further wherein the audio marker is configured to be sensed by the originating user; and
   c. sensing the originating user repeating the associated text and in response thereto disconnecting the first telephony service and for coupling the originating user to a second telephony service at the second telephone number.

21. The method according to claim 20 wherein the first telephony service includes a plurality of audio markers with associated texts, each active upon access to the first telephony service.

22. A system for a user to interactively browse a network of audio information comprising:
   a. a browser controller, comprising:
      1. means for allowing the user to receive audio information and to transmit verbal instructions; and
      2. means for linking the user to a first telephone station in response to a voice command; and
   b. a voice page, comprising:
      1. means for playing information to the user, wherein certain information is played with an audio marker of a linking capability for that information the audio marker distinguishes the certain information from other information played;
      2. means for sensing if the user repeats the information set off by the audio marker; and
      3. means for transmitting a telephone number associated with the certain information and control signal the browser controller in response to sensing that the user repeated the information set off by the audio marker, such that the browser controller disconnects the user from the first telephone station and establishes a new link to a second telephone station with the telephone number.

23. The system according to claim 22 wherein the browser controller further comprises a plurality of predetermined voice commands available to the user.

24. The system according to claim 22 wherein the browser controller further comprises a start page of information regarding preferred links desired by the user.

25. The system according to claim 22 wherein the browser controller further comprises means for monitoring a telephone call and for allowing the browser controller to recapture control of the call in the event the user speaks a predetermined control word.

26. The system according to claim 22 wherein the first telephone station comprises a predetermined information service.

27. The system according to claim 22 wherein the first telephone station comprises an IVR speech system.

28. The system according to claim 22 wherein the first telephone station comprises an IVR dtmf system.

29. The system according to claim 22 wherein the first telephone station comprises a telephony service configured for interacting with the means for linking.

30. The system according to claim 22 wherein the first telephone station comprises a conventional telephone set.

31. The system according to claim 22 wherein the first telephone station comprises a voice-enabled world wide web page.

32. The system according to claim 22 wherein the first telephone station comprises a world wide web page configured to operate in conjunction with a text-to-speech converter.

33. A system for a user to interactively browse a network of audio information comprising:
 a. a browser controller, comprising:
  1. means for allowing the user to receive audio information and to transmit verbal instructions; and
  2. means for linking the user to a voice-enabled world wide web page in response to a voice command; and
 b. a voice page, comprising:
  1. means for playing information to the user, wherein certain information is played with an audio marker of a linking capability for that information, the audio marker distinguishes the certain information from other information played;
  2. means for sensing if the user repeats the information set off by the audio marker; and
  3. means for transmitting a telephone number associated with the certain information and control signal the browser controller in response to sensing that the user repeated the information set off by the audio marker, such that the browser controller disconnects the user from the voice-enabled world wide web page and establishes a new link to a telephone station with the telephone number.

34. The system according to claim 33 wherein the browser controller further comprises a plurality of predetermined voice commands available to the user.

35. The system according to claim 33 wherein the browser controller further comprises a start page of information regarding preferred links desired by the user.

36. The system according to claim 33 wherein the browser controller further comprises means for monitoring a telephone call and for allowing the browser controller to recapture control of the call in the event the user speaks a predetermined control word.

37. The system according to claim 33 wherein the first telephone station comprises a predetermined information service.

38. A method of allowing a user to interactively browse a network of audio information comprising:
 a. allowing the user to receive audio information and to transmit verbal instructions;
 b. linking the user to a first telephone station in response to a voice command; and
 c. at a remote location:
  1. playing information to the user, wherein certain information is played with an audio marker of a linking capability for that information, the audio marker distinguishes the certain information from other information played;
  2. sensing if the user repeats the information set off by the audio marker; and
  3. transmitting a telephone number associated with the certain information and control signal the browser controller in response to sensing that the user repeated the information set off by the audio marker,
such that the user is disconnected from the first telephone station and a new link is established to a second telephone station with the telephone number.

39. A method of allowing a user to interactively browse a network of audio information comprising:
 a. allowing the user to receive audio information and to transmit verbal instructions;
 b. linking the user to a first telephone station in response to a voice command; and
 c. at a remote location:
  1. playing information to the user, wherein certain information is played with an audio marker of a linking capability for that information, the audio marker distinguishes the certain information from other information played;
  2. sensing if the user repeats the information set off by the audio marker; and
  3. transmitting a URL associated the certain information and control signal the browser controller in response to sensing that the user repeated the information set off by the audio marker,
such that the user is disconnected from the first telephone station and a new link is established to a voice-enabled world wide web page with the URL.

40. A method of allowing a user to interactively browse a network of audio information comprising:
 a. allowing the user to receive audio information and to transmit verbal instructions;
 b. linking the user to a first telephone station in response to a voice command; and
 c. at a remote location:
  1. playing information to the user, wherein certain information is played with an audio marker of a linking capability for that information, the audio marker distinguishes the certain information from other information played;
  2. sensing if the user repeats the information set off by the audio marker; and
  3. transmitting a URL associated with the certain information and control signal the browser controller in response to sensing that the user repeated the information set off by the audio marker,
such that the user is disconnected from the first telephone station and a new link is established to a world wide web page configured to operate in conjunction with a text-to-speech converter with the URL.

41. A method of allowing a user to interactively browse a network of audio information comprising:
 a. allowing the user to receive audio information and to transmit verbal instructions;
 b. linking the user to a voice-enabled world wide web page in response to a voice command; and
 c. at a remote location:
  1. playing information to the user, wherein certain information is played with an audio marker of a linking capability for that information, the audio marker distinguishes the certain information from other information played;

2. sensing if the user repeats the information set off by the audio marker; and
3. transmitting a telephone number associated with the certain information and control signal the browser controller in response to sensing that the user repeated the information set off by the audio marker, such that the user is disconnected from the voice-enabled world wide web page and a new link is established to a telephone station with the telephone number.

42. A method of allowing a user to interactively browse a network of audio information comprising:
    a. allowing the user to receive audio information and to transmit verbal instructions;
    b. linking the user to a voice-enabled world wide web page in response to a voice command; and
    c. at a remote location:
       1. playing information to the user, wherein certain information is played with an audio marker of a linking capability for that information, the audio marker distinguishes the certain information from other information played;
       2. sensing if the user repeats the information set off by the audio marker; and
       3. transmitting a URL associated the certain information and control signal the browser controller in response to sensing that the user repeated the information set off by the audio marker, such that the user is disconnected from the voice-enabled world wide web page and a new link is established to a second voice-enabled world wide web page with the URL.

43. A method of allowing a user to interactively browse a network of audio information comprising:
    a. allowing the user to receive audio information and to transmit verbal instructions;
    b. linking the user to a voice-enabled world wide web page in response to a voice command; and
    c. at a remote location:
       1. playing information to the user, wherein certain information is played with an audio marker of a linking capability for that information, the audio marker distinguishes the certain information from other information played;
       2. sensing if the user repeats the information set off by the audio marker; and
       3. transmitting a URL associated with the certain information and control signal the browser controller in response to sensing that the user repeated the information set off by the audio marker, such that the user is disconnected from the voice-enabled world wide web page and a new link is established to a world wide web page configured to operate in conjunction with a text-to-speech converter with the URL.

44. A method of allowing a user to interactively browse a network of audio information comprising:
    a. allowing the user to receive audio information and to transmit verbal instructions;
    b. linking the user to a world wide web page configured to operate in conjunction with a text-to-speech converter in response to a voice command; and
    c. at a remote location:
       1. playing information to the user, wherein certain information is played with an audio marker of a linking capability for that information, the audio marker distinguishes the certain information from other information played;
       2. sensing if the user repeats the information set off by the audio marker; and
       3. transmitting a telephone number associated with the certain information and control signal the browser controller in response to sensing that the user repeated the information set off by the audio marker, such that the user is disconnected from the world wide web page and a new link is established to a telephone station with the telephone number.

45. A method of allowing a user to interactively browse a network of audio information comprising:
    a. allowing the user to receive audio information and to transmit verbal instructions;
    b. linking the user to a world wide web page configured to operate in conjunction with a text-to-speech converter in response to a voice command; and
    c. at a remote location:
       1. playing information to the user, wherein certain information is played with an audio marker of a linking capability for that information, the audio marker distinguishes the certain information from other information played;
       2. sensing if the user repeats the information set off by the audio marker; and
       3. transmitting a URL associated the certain information and control signal the browser controller in response to sensing that the user repeated the information set off by the audio marker, such that the user is disconnected from the world wide web page and a new link is established to a voice-enabled world wide web page with the URL.

46. A method of allowing a user to interactively browse a network of audio information comprising:
    a. allowing the user to receive audio information and to transmit verbal instructions;
    b. linking the user to a world wide web page configured to operate in conjunction with a text-to-speech converter in response to a voice command; and
    c. at a remote location:
       1. playing information to the user, wherein certain information is played with an audio marker of a linking capability for that information, the audio marker distinguishes the certain information from other information played;
       2. sensing if the user repeats the information set off by the audio marker; and
       3. transmitting a URL associated with the certain information and control signal the browser controller in response to sensing that the user repeated the information set off by the audio marker, such that the user is disconnected from the world wide web page and a new link is established to a second world wide web page configured to operate in conjunction with a text-to-speech converter with the URL.

* * * * *

UNITED STATES PATENT AND TRADEMARK OFFICE
CERTIFICATE OF CORRECTION

PATENT NO. : 7,082,397 B2  Page 1 of 1
APPLICATION NO. : 09/203155
DATED : July 25, 2006
INVENTOR(S) : Michael H. Cohen and Tracy Demian Wax It is certified that error appears in the above-identified patent and that said Letters Patent is hereby corrected as shown below:

Title Page, item [56]
IN THE REFERENCES CITED

U.S. PATENT DOCUMENTS should be added,

| | | | |
|---|---|---|---|
| 4,931,950 | 6/1990 | Isle et al | 364/513 |
| 5,592,538 | 1/1997 | Kosowsky et al. | 379/93 |
| 5,933,490 | 8/1999 | White et al. | 379/221 |
| 5,983,190 | 11/1999 | Trower II et al. | 704/276 |
| 5,999,611 | 12/1999 | Tatchell et al. | 379/211 |
| 5,999,965 | 12/1999 | Kelly | 709/202 |
| 6,026,087 | 2/2000 | Mirashrafi et al. | 370/389 |
| 6,031,836 | 2/2000 | Haserodt | 370/389 |
| 6,101,472 | 8/2000 | Giangarra et al. | 704/275 |
| 6,185,535 | 2/2001 | Heidin et al | 704/270 |
| 7,128,380 | 10/2000 | Shaffer et al. | 379/265 |

Signed and Sealed this

Twenty-fourth Day of October, 2006

JON W. DUDAS
*Director of the United States Patent and Trademark Office*